United States Patent [19]
Nakayama et al.

[11] Patent Number: 5,808,801
[45] Date of Patent: Sep. 15, 1998

[54] HEAD MOUNT DISPLAY AND AN OPTICAL SYSTEM FOR USE IN THE DISPLAY

[75] Inventors: Shigeru Nakayama, Kawaguchi; Kenji Tozaki, Tokyo-to, both of Japan

[73] Assignees: Enplas Corporation; Sega Enterprises, Ltd., both of Japan

[21] Appl. No.: 687,616

[22] PCT Filed: Dec. 7, 1995

[86] PCT No.: PCT/JP95/02512

§ 371 Date: Aug. 8, 1996

§ 102(e) Date: Aug. 8, 1996

[87] PCT Pub. No.: WO96/18126

PCT Pub. Date: Jun. 13, 1996

[30] Foreign Application Priority Data

Dec. 9, 1994 [JP] Japan .................................. 6-330878
Jan. 27, 1995 [JP] Japan .................................. 7-030181

[51] Int. Cl.⁶ .................................................. G02B 27/14
[52] U.S. Cl. ............................ 359/630; 359/631; 359/633
[58] Field of Search ................................. 359/631, 633, 359/630; 345/7, 8

[56] References Cited

U.S. PATENT DOCUMENTS

| | | | |
|---|---|---|---|
| 3,787,109 | 1/1974 | Vizenor | 359/631 |
| 3,923,370 | 12/1975 | Mostrom | 359/630 |
| 4,006,971 | 2/1977 | Plummer | 359/869 |
| 4,367,463 | 1/1983 | Suzuki et al. | 340/700 |
| 5,546,227 | 8/1996 | Yasugaki et al. | 359/633 |
| 5,625,493 | 4/1997 | Matsumura et al. | 359/630 |

FOREIGN PATENT DOCUMENTS

| | | |
|---|---|---|
| 0535876A1 | 7/1993 | European Pat. Off. . |
| 62-31531 | 2/1987 | Japan . |
| 1-133479 | 5/1989 | Japan . |
| 3-191389 | 8/1991 | Japan . |
| 2240853 | 8/1991 | United Kingdom . |
| WO96/18126 | 6/1996 | WIPO . |

*Primary Examiner*—Georgia Y. Epps
*Assistant Examiner*—Ricky Mack
*Attorney, Agent, or Firm*—Dickstein Shapiro Morin & Oshinsky, LLP

[57] ABSTRACT

A compact head mount display where an image display means and a magnifying reflecting mirror are substantially symmetrically arranged to a combiner, so that an image displayed on the display means and an outside image can be observed in a magnified and superimposed manner. The magnifying reflecting mirror is arranged as a Fresnel reflecting mirror so that the display becomes more compact. An optical system for use in the head mount display where the magnifying reflecting mirror is arranged as an aspherical surface and the shape of the aspherical surface is so designed that aberrations can be suitably corrected.

6 Claims, 11 Drawing Sheets

SPHERICAL ABERRATION

-0.5    0.5

ASTIGMATISM

-0.5    0.5

DISTORTION

-5.0  (%)  5.0

SPHERICAL ABERRATION

-0.5    0.5

ASTIGMATISM

-0.5    0.5

DISTORTION

-5.0  (%)  5.0

SPHERICAL ABERRATION

-0.5    0.5

ASTIGMATISM

-0.5    0.5

DISTORTION

-5.0  (%)  5.0

SPHERICAL ABERRATION

-0.5    0.5

ASTIGMATISM

-0.5    0.5

DISTORTION

-5.0  (%)  5.0

SPHERICAL
ABERRATION

-0.5    0.5

ASTIGMATISM

-0.5    0.5

DISTORTION

-2.0  (%)  2.0

SPHERICAL ABERRATION

-0.5    0.5

ASTIGMATISM

-0.5    0.5

DISTORTION

-5.0  (%)  5.0

SPHERICAL ABERRATION

-0.5    0.5

ASTIGMATISM

-0.5    0.5

DISTORTION

-5.0  (%)  5.0

SPHERICAL
ABERRATION

-0.5    0.5

ASTIGMATISM

-0.5    0.5

DISTORTION

-0.2  (%)  0.2

SPHERICAL ABERRATION

-0.5    0.5

ASTIGMATISM

-0.5    0.5

DISTORTION

-5.0 (%) 5.0

SPHERICAL ABERRATION

-0.5    0.5

ASTIGMATISM

-0.5    0.5

DISTORTION

-5.0 (%) 5.0

HEAD MOUNT DISPLAY AND AN OPTICAL SYSTEM FOR USE IN THE DISPLAY

TECHNICAL FIELD

The present invention relates to a head mount display.

Further, the present invention relates to an optical system for observing an image obtained from an image information means and an outside image in a superimposed manner on a display such as a head mount type display or a glass type display.

BACKGROUND ART

The head mount display comprises a front housing 12 and rear housing 14 as shown in FIG. 1. When using the head mount display, the housings should be fixed to the head of an observer in such a manner that the front housing 12 is mounted in the vicinity of the eyes of the observer and the rear housing on the back of the head of the observer. An image display means is mounted in the front housing; the image information displayed on the image display means is observed by the observer in an enlarged manner. An image display/observe portion, which is represented by the numerical reference 16, is installed in the front housing 12 of the head mount display.

The image display/observe portion comprises an optical system, whose construction is depicted in FIG. 2 in an enlarged manner. In FIG. 2, the numerical reference 1 represents an image display means such as a liquid crystal display (hereinafter termed "LCD") or a cathode ray tube (hereinafter termed "CRT"), 2 a refractive type lens (so called "lupe"), 3 a semitransparent mirror which serves to combine light coming from at least two directions (hereinafter termed "combiner"), and the numerical reference 4 denotes the eyes of an observer. In such a construction of the image display/observe portion, light coming from an image displayed on the image display means 1 passes through the lens system 2 and is reflected by the combiner 3 to be directed to the eyes 4 of an observer so that image information is enlarged by the lens system 2 Ed then observed by the observer. On the other hand, light 10 coming from outside is made incident upon a front surface 15 of the front housing 12 and is transmitted through the combiner 3, so that the outside image is directly observed by the observer. That is to say, according to the conventional head mount display shown in FIG. 1, the outside image and the image on the image information means are superimposed together to be observed via the combiner.

Another optical system is known which is for use in the image display/observe portion of the head mount display. The construction is shown in FIG. 6. In FIG. 3, the numerical reference 1 represents an image information means such as an LCD or a CRT, 3 a combiner, and the numerical reference 5 also represents a combiner having a concave shape. In this conventional head mount display, light coming from an image obtained by the image information means is reflected by the combiner 3 to be directed to the concave-shaped combiner 5, which is disposed on the opposite side of the observer. The light is reflected by the combiner 5 and then directed to the observer via the combiner 3. Further light coming from outside is transmitted through the concave-shaped combiner 5 first and then through the combiner 3 to be introduced to the eyes 4 of the observer. In this manner, the image coming from the image information means and the image coming from the outside are superimposed and thus observed.

In the head mount display having the image display/observe portion as shown in FIG. 2, the image obtained on the image information means is enlarged by the lens system 2 and is then observed When observing the image which is enlarged by the lens system 2, aberrations should be corrected by the lens system 2 to obtain an optimum enlarged image. Therefore, because an optimum and highly magnified image is required, the lens system 2 should have a complex construction of optical parts using a plural number of lenses. Particularly, in the case where a colored image is observed, it is necessary to correct any chromatic aberration in the lens system well. In order to correct the chromatic aberration efficiently, many lenses including cemented lenses are necessary. Therefore, the size of the lens system 2 becomes large, the weight heavy and the assembling process becomes complex, so that the cost for manufacturing the lens system becomes expensive. Further, since the image information weans 1 and the lens system 2 are positioned above the combiner 3, and as is apparent from the figures, the comparatively heavy image information means 1 as the heavy lens system 2 are closely placed, the arrangement of the optical members is unbalanced in the head mount display.

In the head mount display having the image displaying/observing portion shown in FIG. 3, another combiner having a convex shape is disposed on an outer side of the combiner 3. According to this head mount display, a highly magnified image, where aberrations are well balanced, can be obtained using a small number of optical elements in comparison to the display shown in FIG. 2. However, as is clear from FIG. 3, the light coming from an image of the image information means 1 is reflected by the combiner 3 and the combiner 5 having an aspherical and concave surface, and is then further transmitted through the combiner 3. Therefore, the amount of the light is reduced each time the light is transmitted through the combiner or is reflected by the combiners, so that the amount of light is finally reduced to about ¹⁄₁₀ of the light arriving to the observer. In order to obtain the same brightness in the CRT or the back light disposed in the back of the LCD as in the present invention, the amount of light of the light source for the CRT or LCD must be increased twice. Further, in case an aspherical surface, by which the aberrations are effectively corrected, is used for the concave-shaped combiner, a plastic material can be used because the cost is cheap and such a plastic material is easy to use in mass production. However, a plastic material based combiner causes problems in that the performance and the yield become low and the cost of manufacture high, because it is difficult to provide a multi-layered coating on the base. Furthermore, when assembling the optical system, it is required to assemble the combiner so that it has a concave shape to the axis, which is perpendicular to the center axis of the image display means, with a high accuracy. Particularly, in the reflecting type optical system including the present invention, the accuracy concerning a displacement from an optical axis is severe in comparison to a transmission type optical system. Therefore, the assembly of optical parts on the axis perpendicular to the center axis causes problems in that the yield decreases and the cost of manufacture becomes high, compared to the assembly of optical parts on the perpendicular axis which is conducted in the present invention.

DISCLOSURE OF INVENTION

The present invention has for its purpose to provide a head mount display, in which an image on an image display means and an outside image are observed in a superimposed manner, comprising a combiner for transmitting and reflecting light coming from an image on said image display means, and a magnifying reflecting mirror arranged on the opposite side of said image display means to said combiner; wherein said light coming from said image display means is transmitted through said combiner, and the light is reflected by said magnifying reflection mirror and the n reflected by said combiner to the eyes of an observer; while light from the outside also transmitted through said combiner to the eyes of the observer; whereby said image of said image display means and said outside image can be observed in a superimposed manner.

Another purpose of the present invention is to provide a head mount display in which an image on an image display means and an outside image are observed in a superimposed manner, which comprises a combiner for transmitting and reflecting light coming from an image on said image display means, a magnifying reflection mirror arranged on an opposite side of said image display means to said combiner and a lens element having a weak refractive power for correcting aberrations and being arranged between said image display means and said combiner; wherein said light coming from said image displayed on said image display means is transmitted through said lens for correcting aberrations, is then transmitted through said combiner and the light is reflected by said magnifying reflecting mirror and then reflected by said combiner to be directed to eyes of an observer; while said light coming from the outside is transmitted through said combiner to the eyes of the observer; whereby said image on said image display means and the outside image can be observed in a superimposed manner.

It should be noted that the magnifying reflecting mirror in the present invention is a concave reflecting mirror or a Fresnel reflecting mirror, etc; the concave surface of reflecting mirror or the Fresnel surface of reflecting mirror is arranged to have a light reflecting function.

Another object of the present invention is to provide an optical system for use in a display, which comprises an image display means, a combiner for transmitting and reflecting light coming from said image display means, a magnifying reflecting mirror being disposed on the opposite side of said image display means to said combiner, and an auxiliary lens arranged between said image display means and said combiner; wherein light coming from an image displayed on said image display means is transmitted through said auxiliary lens and said combiner, and the light is reflected by said reflecting mirror and is then directed to the eyes of an observer by said combiner, while light coming from the outside is transmitted through said combiner to the eyes of the observer, whereby said image displayed on said image display means and said outside image are observed in a superimposed manner; and wherein said optical system satisfies the following conditions (1) and (2):

$$0.8 < f/f_R \leq 1.0 \quad (1)$$

$$0.65 < d/f_R < 0.9 \quad (2)$$

wherein the reference symbol f represents the focal length of said optical system as a whole; $f_R$ represents the focal length of said concave reflection mirror itself; and the reference symbol d represents the distance between said concave reflection mirror and the surface of said auxiliary lens on its combiner side when the diopter is zero.

The present invention has still another object, which is to provide an optical system for use in a display, which comprises an image display means, a combiner for transmitting and reflecting light coming from said image display means, and a magnifying reflection mirror disposed between said image display means and said combiner; wherein light coming from an image of said image display means is transmitted through said combiner, and the light is reflected by said reflection mirror and is then reflected by said combiner to the eyes of an observer, while light coming from the outside is transmitted through said combiner to the eyes of the observer, whereby said image displayed on said image display means and said outside image are observed in a superimposed manner; and wherein said concave surface reflection mirror is arranged as an aspherical surface existing between an elliptically rotating surface $S_1$ represented by the following equation (3) and an elliptically rotating surface $S_2$ shown by the following equation (4):

$$z = \frac{Cy^2}{1 + \sqrt{1 - (k_1 + 1)C^2 y^2}} \quad (3)$$

wherein $k_1 C^2 = 7.5 \times 10^{-5}$ $$z = \frac{Cy^2}{1 + \sqrt{1 - (k_2 + 1) \; C^2 y^2}} \quad (4)$$

wherein $k_2 C^2 = 1.0 \times 10^{-3}$;

wherein the reference symbols $k_1$ and $k_2$ represent coefficients of the aspherical surface, respectively, and the reference symbol C is the curvature of the standard surface (an inverse number of the radius of curvature).

The present invention has still another object namely to provide an optical system for use in a display, which comprises an image display means, a combiner for transmitting and reflecting light coming from said image display means, a Fresnel reflecting mirror being arranged on an opposite side of the image display means to said combiner, and an auxiliary lens disposed between said image display means and said combiner; wherein light coming from an image of said image display means is transmitted through said combiner and the light is reflected by said Fresnel reflecting mirror and then reflected by the combiner to be directed to the eyes of an observer, while light coming from outside is transmitted through said combiner to the eyes of the observer, whereby said image on said image display means and said outside image are observed in a superimposed manner; and wherein said optical system satisfies the following conditions (5) and (6):

$$0.8 < f/f_R \leq 1.0 \quad (5)$$

$$0.65 < d/f_R < 0.95 \quad (6)$$

wherein the reference symbol f represents the focal length of said optical system as a whole, $f_R$ represents the focal length of said Fresnel reflecting mirror itself, and the reference symbol d represents a distance between said Fresnel reflection mirror and a surface of said auxiliary lens on a combiner side when a diopter is zero.

The present invention has still another object to provide an optical system for use in a display, which comprises an image display means, a combiner for transmitting and reflecting light coming from said image display means, a Fresnel reflection mirror being arranged on an opposite side of said image display means to said combiner; wherein light coming from an image displayed on said image display means is transmitted through said combiner and the light is reflected by said Fresnel reflecting mirror and is then reflected by the combiner to the eyes of an observer, while light coming from the outside is transmitted through said combiner to the eyes of the observer, whereby said image displayed on said image display means and said outside image are observed in a superimposed manner; and wherein a Fresnel surface of said reflecting mirror is arranged as an aspherical surface existing between an elliptically rot ting surface $S_3$ represented by the following equation (7) and an elliptically rotating surface $S_4$ shown by the following equation (8) when the Fresnel surface of the Fresnel reflection mirror is restored into a continuous single surface:

$$z = \frac{Cy^2}{1 + \sqrt{1 - (k_3 + 1)C^2 y^2}} \quad (7)$$

wherein $k_3 C^2 = 7.5 \times 10^{-5}$ $$z = \frac{Cy^2}{1 + \sqrt{1 - (k_4 + 1)C^2 y^2}} \quad (8)$$

wherein $k_4 C^2 = -1.0 \times 10^{-3}$;

wherein the reference symbols $k_3$ and $k_4$ represent coefficients of aspherical surfaces, respectively, and the reference symbol C is the curvature of a standard surface (an inverse number of the radius of curvature).

BEST MODE FOR CARRYING OUT THE INVENTION

Figure 1:
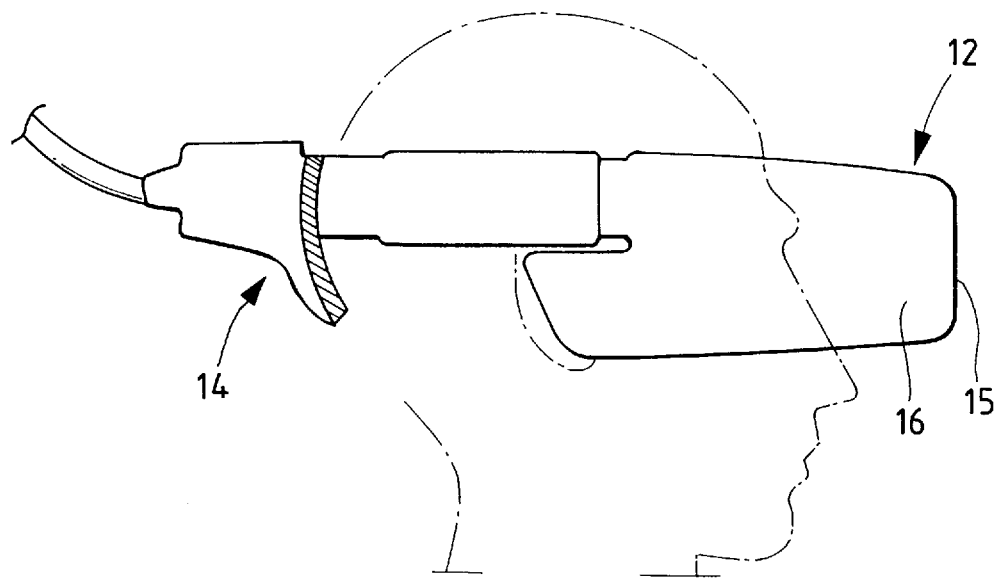
FIG. 1 is a schematic view showing an outline of the head count display.
Figure 2:
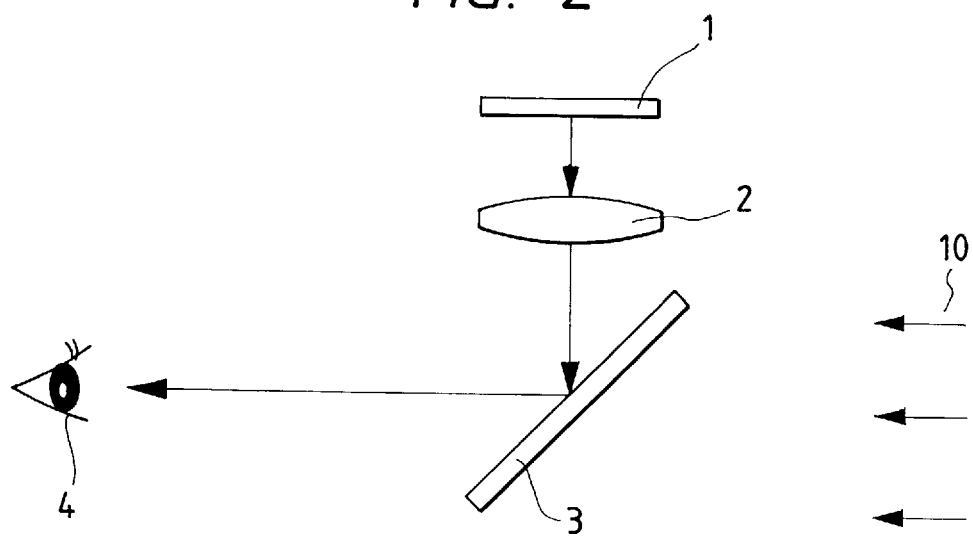
FIG. 2 is a schematic view illustrating a construction on the image displaying/observing portion of the conventional head mount display.
Figure 3:
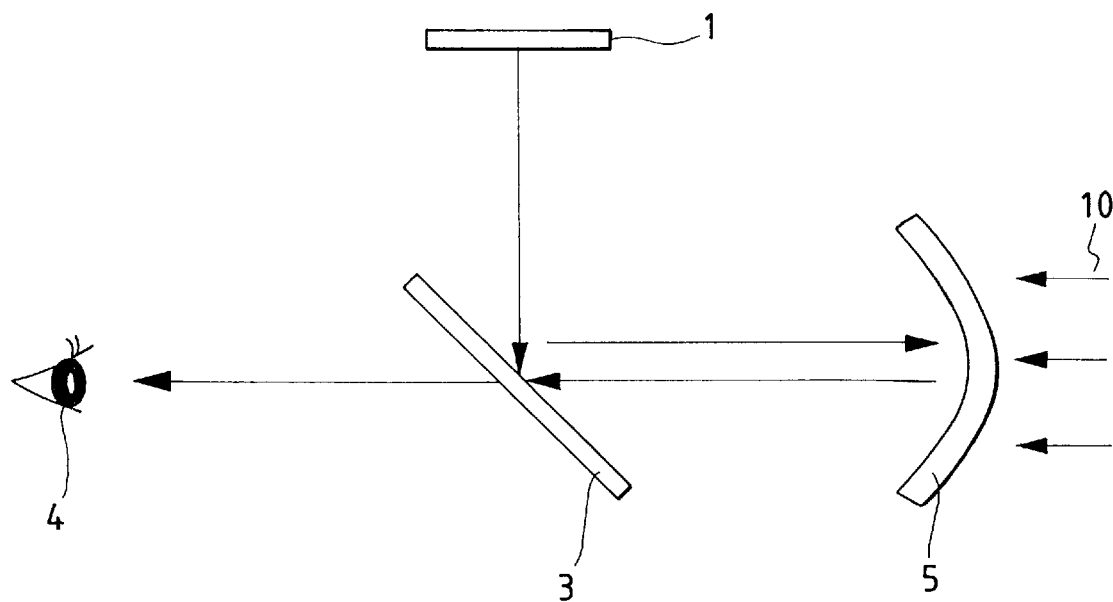
FIG. 3 is a schematic view depicting another construction of the image display/observe portion of the conventional head mount display.
Figure 4:
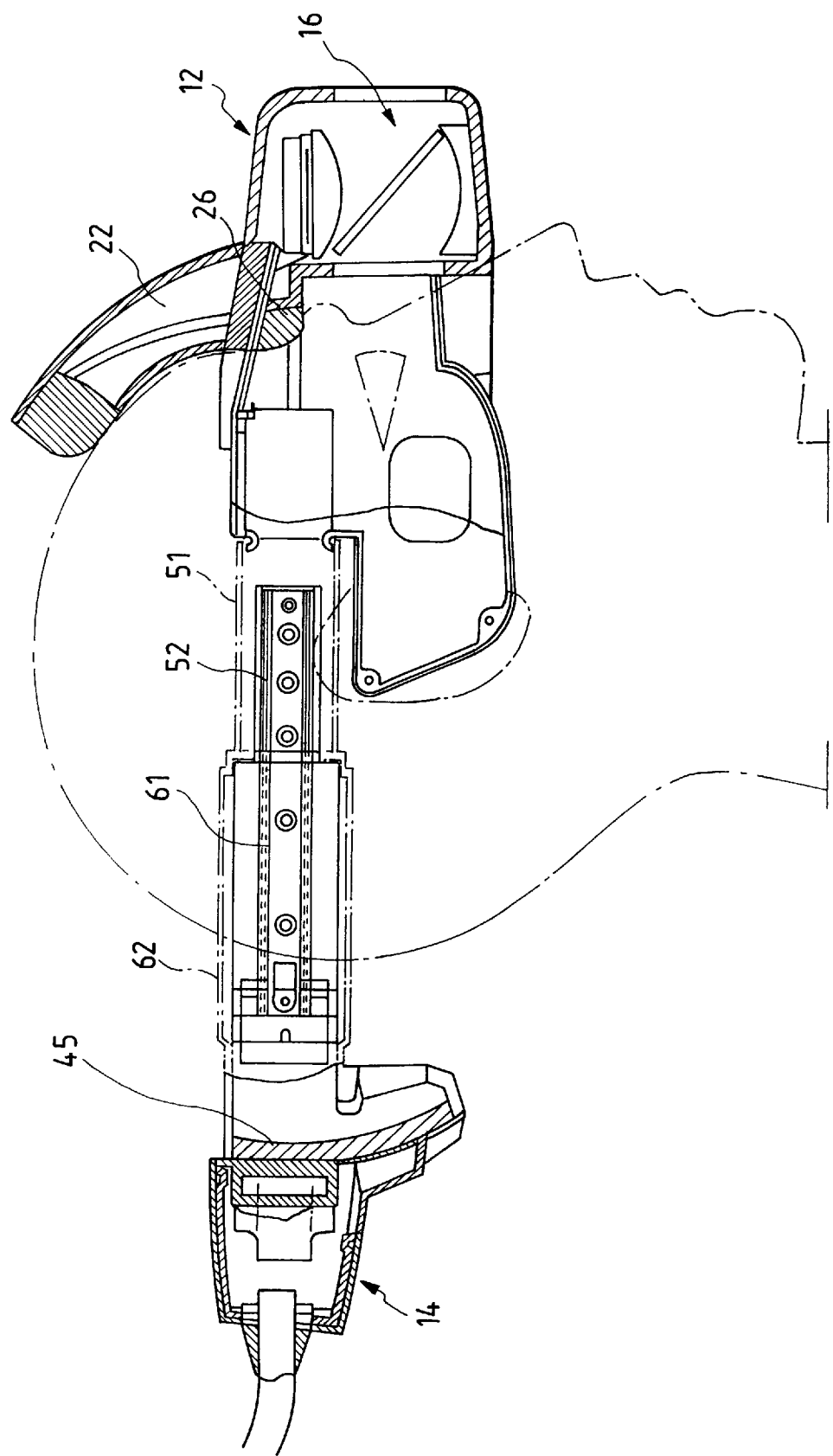
FIG. 4 is a schematic view representing a construction of the head mount display according to the present invention.

FIG. 4 is a schematic view showing a total construction of the head mount display according to the present invention.

In FIG. 4, the numerical reference 12 represents a front housing, 14 a rear housing, and the numerical reference 16 denotes an image displaying/observing portion contained in the front housing 12; the construction of the portion 16 is stated in detail below. Further, the numerical reference 22 represents a supporting member, 24 a pad member which is used by being urged against a top portion of the head of the observer, and the numerical reference 26 denotes a pad member which is used by being urged against the front part of the head of the observer. Both of the pad members are provided on the supporting member. The numerical reference 45 represents a pad member provided in the rear housing 14, 51 is a hollow housing the inside of which is curved so as to correspond to the temporal of the head of the observer, 52 is a slider having a constant width provided in said hollow housing 51, 61 is a rail member and the numerical reference 62 denotes another hollow housing which is movably arranged in the hollow housing 51.

The thus constructed head mount display is mounted on the head of the user as shown in FIG. 4; the hollow housing 62 is inserted into the housing 51 so that the pad 45 is urged against the occipital of the head.

Figure 5:
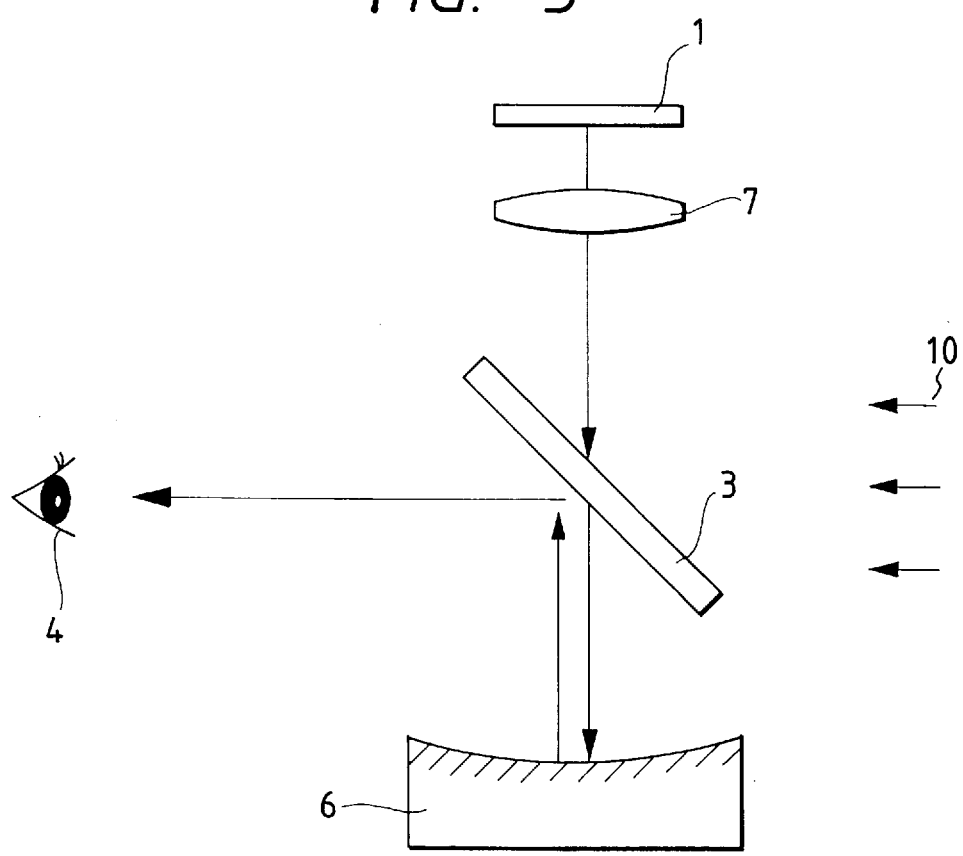
FIG. 5 is a schematic view showing a construction of the first embodiment of the image display/observe portion of the head mount display according to the invention.
Figure 6A:
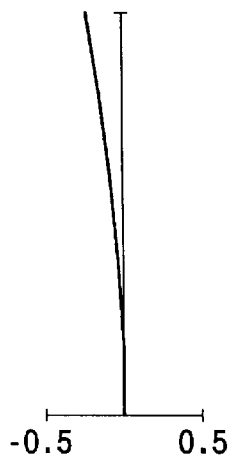
FIGS. 6 to 10 depict aberration curves of the optical systems according to the first to fifth embodiments of the present invention, respectively.
Figure 6B:
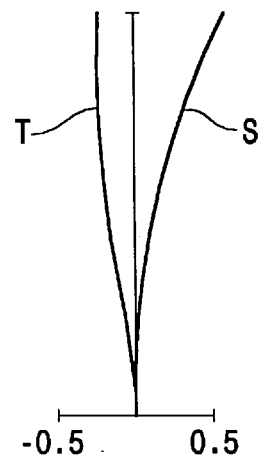
Figure 6C:
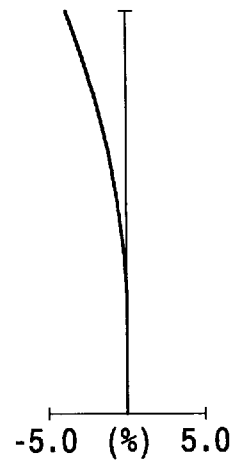
Figure 7A:
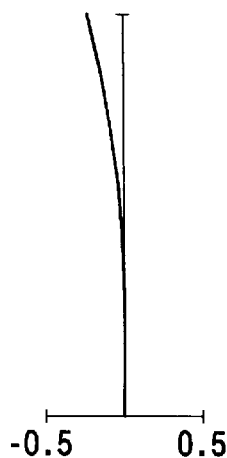
Figure 7B:
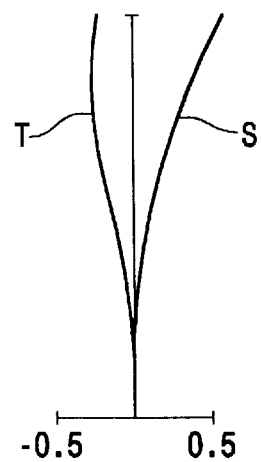
Figure 7C:
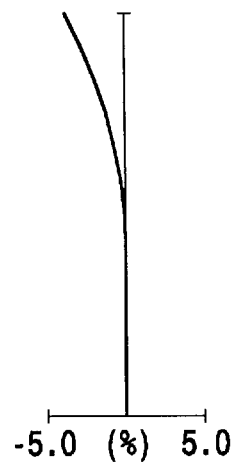
Figure 8A:
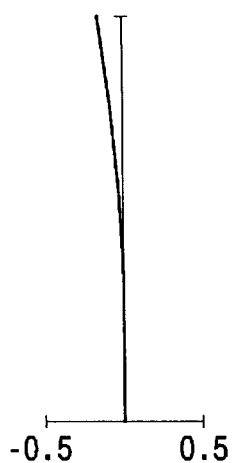
Figure 8B:
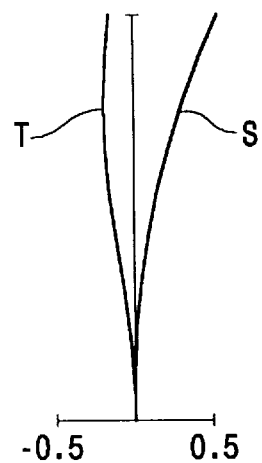
Figure 8C:
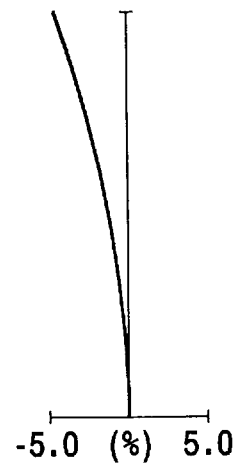
Figure 9A:
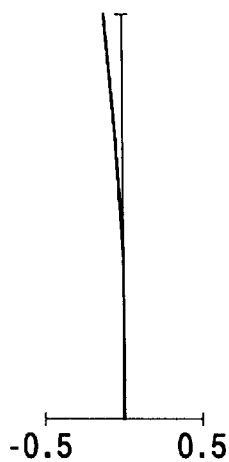
Figure 9B:
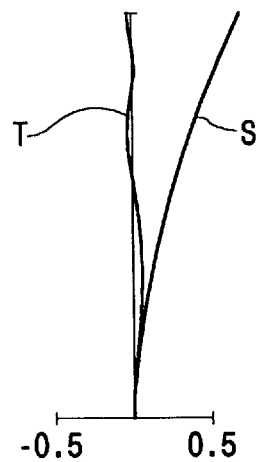
Figure 9C:
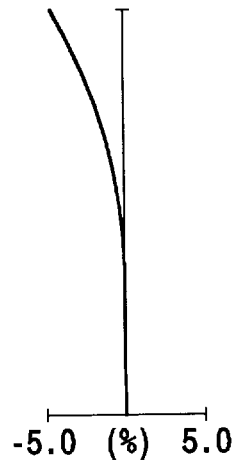
Figure 10A:
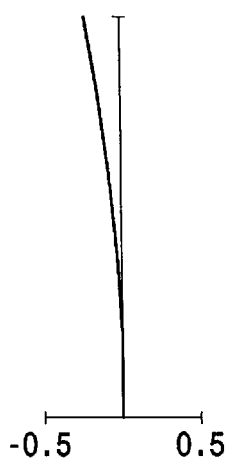
Figure 10B:
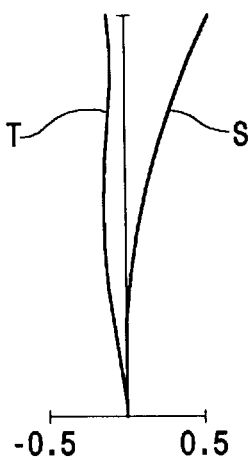
Figure 10C:
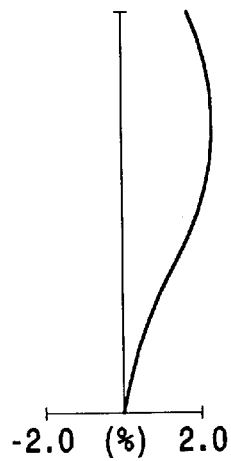

The image displaying/observing portion disposed in the front housing of the mount display has its construction shown in FIG. 5, where the numerical reference 1 represents an image information means such as an LCD, a CRT, etc., 3 a combiner, 6 a concave reflecting mirror as a magnifying reflecting mirror, and the numerical reference 7 denotes an auxiliary lens being constituted of an aberration correction lens having almost no power. The lens 7 is used as occasion demands. In the image displaying/observing portion of the head mount display according to the present invention having the above stated construction, light coming from the image information means is transmitted through the auxiliary lens 7 and then through the combiner 3, and the light is reflected by the concave reflecting mirror 6 to be turned and then reflected by the combiner 3 by 45 degrees to be directed to the eyes 4 of the observer. A virtual image, which is formed being magnified by the concave reflection mirror 6 is then observed by the observer.

On the other hand, light 10 coming from outside is transmitted through the combiner 3 and then directly introduced to the eyes 4 of the observer.

In this manner, the image obtained by the image information means and the outside image are observed in a superimposed manner. It may be possible to arrange a light shielding plate to interrupt light coming from outside to an opening of the display, so that the plate opens and closes; through the opening light coming from outside enters into the display. It should be noted that a filter or a liquid crystal shutter can be used instead of the shielding plate. By arranging such a light shielding plate, etc, light coming from outside is interrupted, so that only the image coming from the image information means is observed. In the case where a suitable filter or liquid crystal shutter is arranged instead of the light shielding plate, the amount of light coming from outside can be controlled so that the image coming from the image information means and the outside image can be superimposed with a well-balanced brightness.

In the head mount display according to the present invention, the image displaying/observing portion is arranged such that the image information means 1 and the auxiliary lens 7 are almost symmetrical to the concave reflecting mirror 6 to the combiner 3, which is well balanced.

Further, the light coming from the image information means 1 is transmitted through the combiner 3 once and is reflected once. Therefore, about 50% of the light is transmitted through the combiner 3 and then about 50% is reflected by the combiner after being reflected by the concave reflecting mirror. Therefore, the reduction of light by reflection of the combiner is significantly low, that means about 25% of the light arrives to the eyes 4 of the observer, so that a bright image can be obtained.

Furthermore, since the image is magnified with the aid of the concave reflecting mirror, no chromatic aberration is generated, and since the auxiliary lens has almost no power, only a little chromatic aberration is generated by the auxiliary lens. In this case, other aberrations except for chromatic aberrations can be corrected by the aspherical surface provided on the concave reflecting mirror and the auxiliary lens. It should be noted that the auxiliary lens works not only to correct the aberrations but also to prevent the light coming from the image information means, such as an LCD, being made incident upon the eyes directly, as a stay light shielding plate.

In the head mount display according to the present invention, since several images coming from the image information means are observed with both eyes, the observer easily can have the experience of viewing a three-dimensional image. If the above-said liquid crystal shutter is used, it is possible to give information of an outside image, which is a real image, and the image from the image information means, which is a virtual image, as if they were the same image, by controlling the variation of the outside light with the aid of the shutter.

The optical system for use in the display according to the present invention comprises an image display means, a combiner for transmitting and reflecting light coming from the image display means, a concave reflecting mirror arranged on an opposite side of the image display means to the combiner, and an auxiliary lens arranged between the image display means and the combiner; wherein said optical system satisfies the following conditions (1) and (2):

$$0.8 < f/f_R \leq 1.0 \quad (1)$$

$$0.65 < d/f_R < 0.9 \quad (2)$$

wherein the reference symbol f represents the focal length of the optical system as a whole, $f_R$ the focal length of the convex reflection mirror itself, and the reference symbol d represents the distance between the concave reflecting mirror and the surface of the auxiliary lens on the combiner side.

In the optical system according to the invention, the optical elements are arranged in the above-mentioned order; the light coming from the image display means is transmitted through the auxiliary lens and the combiner, which is arranged to be inclined with respect to an optical axis about 45 degrees, and is then reflected by the concave reflection mirror to be returned; the light is reflected by the combiner and is then introduced to the eyes of the observer. Thereby, the observer mainly observes an image coming from the image display means, which is magnified by the concave reflection mirror. On the other hand, light coming from outside is transmitted through the combiner and then arrives to the observer's eyes, so that the observer also observes the outside image. In this manner the observer observes the magnified image coming from the image display means and the outside image in a superimposed manner.

In this optical system, since the magnified image coming from the image information means is observed via the combiner. Therefore, in order to assure an apparent field of view of the magnified image to some extent with respect to the position of the eyes of the observer, it is required that the combiner has a predetermined large aperture. Further, since the outside image is observed through the combiner being superimposed with the image coming from the image display means, the combiner should have a predetermined large aperture for this purpose. Therefore, it is necessary to have a space between the auxiliary lens and the concave reflection mirror to arrange such a predetermined large combiner.

Further, in order to control the diopter using the auxiliary lens as a magnifying lupe, two ways are considered, one of which is to move the concave reflecting mirror up and down and the other is to move the image display means up and down.

In order to obtain a minus diopter, which is actually important as a lupe, by moving the mirror up and down, the concave reflecting mirror should be moved in an upper direction. That is to say, the concave reflection mirror is moved close to the combiner. Therefore, it should be necessary to have a greater large distance between the auxiliary lens and the concave reflecting mirror.

In case the latter way is taken to control the diopter, in order to obtain minus diopter, the image display means should be moved downwards so as to bring it closer to the auxiliary lens. Therefore, it is necessary to have a space between the auxiliary lens and the image display means. It should be noted that the image display means is an imaged surface of the optical system.

On the other hand, in order to make the magnifying ratio of the magnified image coming from the image display means high, it is necessary to make short the total focal length of the concave reflection mirror and the auxiliary lens. By making the total focal length short, the concave reflection mirror and the image display means, which is an imaged point of the optical system as a whole, come close together, while this is contradictory to make the space therebetween great.

In order to cause the above mentioned relationships, the optical system according to the present invention is arranged to satisfy the conditions (1) and (2).

When the value of the condition (1) becomes 1.0, which means that the power of the concave reflection mirror occupies the power of the optical system as a whole, the power of the auxiliary lens is 0, so that the auxiliary lens serves as a plane-parallel plate. When the value of the condition (1) is less than 1.0, the auxiliary lens will be a convex lens having a weak refractive power. As the value of the condition (1) becomes closer to the upper limit thereof, the concave reflection mirror becomes closer to the image display means, so that it becomes difficult to have enough space between the concave reflection mirror and the auxiliary lens and between the auxiliary lens and the image display means. Such an arrangement has an advantage for the optical system where no diopter control is conducted. However, it is generally preferred that the value of the condition (1) is 0.95 or less.

On the other hand, when the value of the condition (1) becomes lower than the lower limit thereof, enough distance between the optical elements can be obtained but light generated from the image display means having a very inclined direction arrives to the eyes of the observer. Therefore, when an image display means having a powerful directional characteristic, such as an LCD, is used as the image display means, the performance of the optical system deteriorates. Further, the power of the auxiliary lens becomes strong, so that chromatic aberrations are generated.

For these reasons, the preferred range of the condition (1) is from 0.85 to 0.95.

The condition (2) is provided for giving a necessary aperture to the combiner as stated above. When it is arranged to move the concave reflection mirror 6 up and down to control the diopter, the value around the upper limit of the condition (2) must be selected, while, when it is arranged to move the image display means up and down, the value around the lower limit of the condition (2) must be selected.

In this case, the auxiliary lens serves not only to distribute the power, which is accompanied to the condition (1), of the optical lens system in a suitable manner, and to correct the aberrations, but also to shut out the stray light arriving to the eyes of the observer directly and further it serves to protect from dusts.

Since the construction of the optical system according to the present invention is simple, once the power distribution is determined, it becomes almost impossible to positively correct aberrations. Therefore, it is effective to use aspherical surface(s) on the concave reflecting mirror or on the auxiliary lens or on both optical elements. It should be noted that even if the auxiliary lens is a plane-parallel plate, it is possible to provide an aspherical surface thereon.

Since the main power of the optical system exists on the concave reflecting mirror, the Petzval's sum of the optical system becomes negative, so that the image surface is curved on the overcorrect side. Such a curved image surface is corrected to a negative side by introducing an aspherical surface thereon. In this case, the degree of the aspherical surface of the concave reflecting mirror is particularly important.

The desired shape of the aspherical surface, which is used in the optical system according to the present invention, will be explained below.

The desired aspherical surface for the optical system of the present invention exists between the ellipse rotation surface $S_1$ which is represented by the following formula (3) and the ellipse rotation surface $S_2$ which is shown by the following formula (4).

$$z = \frac{Cy^2}{1 + \sqrt{1 - (k_1 + 1) \ C^2 y^2}} \quad (3)$$

where $k_1 C^2 = 7.5 \times 10^{-5}$ $$z = \frac{Cy^2}{1 + \sqrt{1 - (k_2 + 1) C^2 y^2}} \quad (4)$$

where $k_2 C^2 = 1.0 \times 10^{-3}$

In the above formulae (3) and (4), the reference symbol $k_1$ and $k_2$ represent coefficients of the aspherical surface, respectively, and C represents the curvature of the standard surface (an inverse number of the radius of curvature).

When an aspherical surface, all parts of which are exist between the ellipse rotation surfaces $S_1$ and $S_2$ represented by the formulae (3) and (4), respectively, is used for the concave surface of the concave reflection mirror, each aberration can be corrected in a well-balanced manner.

If the aspherical degree of the aspherical surface is so weak that the surface is positioned outside of the ellipse rotation surface $S_2$ side (between the ellipse rotation surface $S_1$ and the standard spherical surface of the curvature C), astigmatism and coma, caused by the curvature of field, can be corrected by combining the aspherical surface and the auxiliary lens. However, a strong pincushion distortion is observed from the observer side and the directional characteristics of the image display means are deteriorated. While, if the aspherical degree of the aspherical surface is so strong that the surface is positioned over the ellipse rotation surface $S_2$, the aspherical surface becomes suitable for the directional characteristic of the image display means, however aberrations could not be corrected well.

Even when only the concave reflecting mirror is arranged as an aspherical surface existing between the ellipse rotation surfaces $S_1$ and $S_2$, the aberrations of the optical system can be corrected. If the auxiliary lens is also arranged as an aspherical surface, the aberrations can be corrected more effectively.

Further, when the aspherical surface is provided only on the auxiliary lens and the concave reflecting mirror is arranged as a spherical surface, the aberrations can be corrected, however a small amount of sagittal image surface is left.

The construction of the optical system for use in a display according to the present invention is illustrated in FIG. 5, where an image display means 1, a combiner 3, a concave reflection mirror 6 and an auxiliary lens 7 are provided. The numerical reference 4 represents the eyes of the observer.

In this optical system, the light coming from the image display means 1 is transmitted through the auxiliary lens 7 and the combiner 3, the light reflected by the concave reflecting mirror 6 and further reflected by the combiner 3 to the eyes 4. Thereby, a magnified image on the image display means is observed by the observer. The light 10 coming from outside is made incident upon the optical system through a glass window 8 and then is transmitted through the combiner 3 to be directed to the eyes 4. Therefore, the observer can observe not only the image coming from the image display but also an outside image. That is to say, the magnified image on the image display 1 and the outside image can be observed in a superimposed manner.

As illustrated in FIG. 5, the optical system of the present invention comprises only a few optical elements and thus the construction is compact. Further, as shown in the data of the first to fifth embodiments, if the optical system satisfies the above-mentioned requirements, i.e. satisfying the conditions, etc. a highly qualified image where aberration are well corrected may be observed in a wide apparent field of view, while keeping the optical system compact.

First Embodiment

| Surface No. | Radius of Curvature (mm) | Distance between surfaces (mm) | Refractive Index | Abbe's Number |
|---|---|---|---|---|
| 1 | 0.000 | 26.0000 | 1.00000 | |
| 2 | 0.000 | −12.5000 | −1.00000 | |
| 3 | 57.971 | 20.5000 | 1.00000 | |
| 4 | 36.354 | 2.6000 | 1.49194 | 56.09 |
| 5 | 0.000 | 5.8688 | 1.00000 | |

Coefficient of Aspherical Surface

3rd surface K=0.2073932
 $A_2=0.7371736 \times 10^{-6}$
 $A_3=-0.1855806 \times 10^{-8}$
 $A_4=0.3400349 \times 10^{-12}$ 4th surface K=−0.6006190
 $A_2=-0.3082918 \times 10^{-4}$
 $A_3=0.1129399 \times 10^{-6}$
 $A_4=0.1861033 \times 10^{-9}$ $f/f_R=0.897$
$d/f_R=0.707$

Second Embodiment

| Surface No. | Radius of Curvature (mm) | Distance between surfaces (mm) | Refractive Index | Abbe's Number |
|---|---|---|---|---|
| 1 | 0.000 | 26.0000 | 1.00000 | |
| 2 | 0.000 | −12.5000 | −1.00000 | |
| 3 | 61.177 | 20.5000 | 1.00000 | |
| 4 | 28.124 | 3.5000 | 1.49194 | 56.09 |
| 5 | 0.000 | 6.2293 | | |

Coefficient of Aspherical Surface

3rd surface $K=0.8034292$
$A_I=0.3128657\times10^{-6}$
$A_J=-0.1860154\times10^{-8}$ 4th surface $K=-0.1011022\times10$
$A_I=-0.2110857\times10^{-4}$
$A_J=0.1310162\times10^{-6}$ $f/f_R=0.850$
$d/f_R=0.670$

Third Embodiment

| Surface No. | Radius of Curvature (mm) | Distance between surfaces (mm) | Refractive Index | Abbe's Number |
|---|---|---|---|---|
| 1 | 0.000 | 26.0000 | 1.00000 | |
| 2 | 0.000 | −12.5000 | −1.00000 | |
| 3 | 57.971 | 20.5000 | 1.00000 | |
| 4 | 36.354 | 2.8000 | 1.49194 | 56.09 |
| 5 | 0.000 | 5.8688 | 1.00000 | |

Coefficient of Aspherical Surface

3rd surface $K=-0.5609107$
$A_2=0.7626161\times10^{-6}$
$A_3=-0.1936394\times10^{-9}$
$A_4=-0.4240364\times10^{-12}$ $f/f_R=0.897$
$d/f_R=0.707$

Fourth Embodiment

| Surface No. | Radius of Curvature (mm) | Distance between surfaces (mm) | Refractive Index | Abbe's Number |
|---|---|---|---|---|
| 1 | 0.000 | 26.0000 | 1.00000 | |
| 2 | 0.000 | −12.5000 | −1.00000 | |
| 3 | 57.971 | 20.5000 | 1.00000 | |
| 4 | 36.354 | 2.6000 | 1.49194 | 56.09 |
| 5 | 0.000 | 5.8688 | 1.00000 | |

Coefficient of Aspherical Surface

4th surface $K=0.1556867\times10$
$A_2=-0.3047007\times10^{-4}$
$A_3=0.5961372\times10^{-6}$
$A_4=-0.3985710\times10^{-8}$
$A_5=0.9794985\times10^{-11}$ $f/f_R=0.897$
$d/f_R=0.707$

Fifth Embodiment

| Surface No. | Radius of Curvature (mm) | Distance between surfaces (mm) | Refractive Index | Abbe's Number |
|---|---|---|---|---|
| 1 | 0.000 | 26.0000 | 1.00000 | |
| 2 | 0.000 | −16.1100 | −1.00000 | |
| 3 | 59.001 | 24.1100 | 1.00000 | |
| 4 | 19.697 | 3.5000 | 1.49194 | 56.09 |
| 5 | 0.000 | 2.4048 | 1.00000 | |

Coefficient of Aspherical Surface

3rd surface $K=-0.5219198$
$A_2=0.1451053\times10^{-5}$
$A_3=-0.5070955\times10^{-8}$
$A_4=0.1545496\times10^{-10}$
$A_5=-0.1811484\times10^{-13}$ 4th surface $K=-0.1000000\times10^2$ $f/f_R=0.881$
$d/f_R=0.817$ In these data, the surface number 1 represents the eyes of the observer, 2 represents a combiner, 3 represents a concave reflection mirror, 4 represents a surface of the auxiliary lens on the combiner side, and the surface number 5 represents a surface of the auxiliary lens on the image display means side. The minus sign shown on the distance and the refractive index indicate that the light goes into the opposite direction.

Sag values of the aspherical surface provided on the concave reflection mirror of the above-mentioned embodiments and sag values of the ellipse rotational surfaces $S_1$ and $S_2$ are shown as follows. It should be noted that a spherical surface is provided on the concave reflection mirror in the fourth embodiment. Therefore, no sag value is indicated.

The term "sag value", for example, at an arbitrary position y1 on y axis means a distance along an optical axis measured from an upper position of a curved surface, which corresponds to the position y1 on the y axis, to a position of the top portion of the curved surface, which exist on the optical axis, when the y axis is taken in a perpendicular direction to the optical axis.

First Embodiment

| Aspherical Surface of Concave Reflection Mirror | |
|---|---|
| Value of Y axis | Sag Value |
| .00000 | .00000 |
| 1.00000 | .00863 |
| 2.00000 | .03452 |
| 3.00000 | .07775 |
| 4.00000 | .13838 |
| 5.00000 | .21654 |
| 6.00000 | .31238 |
| 7.00000 | .42606 |
| 8.00000 | .55775 |
| 9.00000 | .70765 |
| 10.00000 | .87594 |
| 11.00000 | 1.06280 |
| 12.00000 | 1.28838 |
| 13.00000 | 1.49282 |
| 14.00000 | 1.73620 |
| 15.00000 | 1.99857 |
| 16.00000 | 2.27989 |

-continued

Aspherical Surface of Concave Reflection Mirror

| Value of Y axis | Sag Value |
|---|---|
| 17.00000 | 2.58007 |
| 18.00000 | 2.89895 |

$S_1$ Surface

| | |
|---|---|
| .00000 | .00000 |
| 1.00000 | .00863 |
| 2.00000 | .03451 |
| 3.00000 | .07769 |
| 4.00000 | .13821 |
| 5.00000 | .21613 |
| 6.00000 | .31155 |
| 7.00000 | .42457 |
| 8.00000 | .55533 |
| 9.00000 | .70398 |
| 10.00000 | .87069 |
| 11.00000 | 1.05566 |
| 12.00000 | 1.25912 |
| 13.00000 | 1.48132 |
| 14.00000 | 1.72254 |
| 15.00000 | 1.98309 |
| 16.00000 | 1.26332 |
| 17.00000 | 2.56360 |
| 18.00000 | 2.88434 |

$k_1 = 0.2520478$ $S_2$ Surface

| | |
|---|---|
| .00000 | .00000 |
| 1.00000 | .00863 |
| 2.00000 | .03454 |
| 3.00000 | .07785 |
| 4.00000 | .13872 |
| 5.00000 | .21613 |
| 6.00000 | .31421 |
| 7.00000 | .42957 |
| 8.00000 | .58398 |
| 9.00000 | .71802 |
| 10.00000 | .89246 |
| 11.00000 | .108816 |
| 12.00000 | 1.30617 |
| 13.00000 | 1.54772 |
| 14.00000 | 1.81430 |
| 15.00000 | 2.10771 |
| 16.00000 | 2.43011 |
| 17.00000 | 2.78417 |
| 18.00000 | 3.17321 |

$k_2 = 3.3606385$

Second Embodiment

Aspherical Surface of Concave Reflection Mirror

| Value of Y axis | Sag Value |
|---|---|
| .00000 | .00000 |
| 1.00000 | .00817 |
| 2.00000 | .03271 |
| 3.00000 | .07366 |
| 4.00000 | .13109 |
| 5.00000 | .20511 |
| 6.00000 | .29583 |
| 7.00000 | .40340 |
| 8.00000 | .52796 |
| 9.00000 | .66967 |
| 10.00000 | .82866 |
| 11.00000 | 1.00507 |
| 12.00000 | 1.19900 |
| 13.00000 | 1.41052 |
| 14.00000 | 1.63964 |

-continued

Aspherical Surface of Concave Reflection Mirror

| Value of Y axis | Sag Value |
|---|---|
| 15.00000 | 1.88632 |
| 16.00000 | 2.15042 |
| 17.00000 | 2.43174 |
| 18.00000 | 2.72994 |

$S_1$ Surface

| | |
|---|---|
| .00000 | .00000 |
| 1.00000 | .00817 |
| 2.00000 | .03270 |
| 3.00000 | .07361 |
| 4.00000 | .13095 |
| 5.00000 | .20476 |
| 6.00000 | .29514 |
| 7.00000 | .40217 |
| 8.00000 | .52597 |
| 9.00000 | .66667 |
| 10.00000 | .82441 |
| 11.00000 | .99939 |
| 12.00000 | 1.19178 |
| 13.00000 | 1.40181 |
| 14.00000 | 1.62971 |
| 15.00000 | 1.87575 |
| 16.00000 | 2.14023 |
| 17.00000 | 2.42347 |
| 18.00000 | 2.72582 |

$k_1 = 0.280973$ $S_2$ Surface

| | |
|---|---|
| .00000 | .00000 |
| 1.00000 | .00818 |
| 2.00000 | .03273 |
| 3.00000 | .07377 |
| 4.00000 | .13144 |
| 5.00000 | .20597 |
| 6.00000 | .29786 |
| 7.00000 | .40689 |
| 8.00000 | .53413 |
| 9.00000 | .67993 |
| 10.00000 | .84498 |
| 11.00000 | 1.03006 |
| 12.00000 | 1.23614 |
| 13.00000 | 1.46435 |
| 14.00000 | 1.71605 |
| 15.00000 | 1.99287 |
| 16.00000 | 2.29676 |
| 17.00000 | 2.63013 |
| 18.00000 | 2.99597 |

$k_2 = 3.74263$

Third Embodiment

Aspherical Surface of Concave Reflection Mirror

| Value of Y axis | Sag Value |
|---|---|
| .00000 | .00000 |
| 1.00000 | .00863 |
| 2.00000 | .03452 |
| 3.00000 | .07771 |
| 4.00000 | .13827 |
| 5.00000 | .21627 |
| 6.00000 | .31184 |
| 7.00000 | .42511 |
| 8.00000 | .55622 |
| 9.00000 | .70537 |
| 10.00000 | .87273 |
| 11.00000 | 1.05851 |
| 12.09009 | 1.26295 |

Aspherical Surface of Concave Reflection Mirror

| Value of Y axis | Sag Value |
|---|---|
| 13.00000 | 1.48626 |
| 14.00000 | 1.72868 |
| 15.00000 | 1.99042 |
| 16.00000 | 2.27169 |
| 17.00000 | 2.57267 |
| 18.00000 | 2.89352 |

$S_1$ Surface

| Value of Y axis | Sag Value |
|---|---|
| .00000 | .00000 |
| 1.00000 | .00863 |
| 2.00000 | .03451 |
| 3.00000 | .07769 |
| 4.00000 | .13821 |
| 5.00000 | .21613 |
| 6.00000 | .31155 |
| 7.00000 | .42457 |
| 8.00000 | .55533 |
| 9.00000 | .70398 |
| 10.00000 | .87069 |
| 11.00000 | 1.05566 |
| 12.00000 | 1.25912 |
| 13.00000 | 1.48132 |
| 14.00000 | 1.72254 |
| 15.00000 | 1.98309 |
| 16.00000 | 2.26332 |
| 17.00000 | 2.56360 |
| 18.00000 | 2.88434 |

$k_1 = 0.2520478$

$S_2$ Surface

| Value of Y axis | Sag Value |
|---|---|
| .00000 | .00000 |
| 1.00000 | .00863 |
| 2.00000 | .03454 |
| 3.00000 | .07785 |
| 4.00000 | .13872 |
| 5.00000 | .21740 |
| 6.00000 | .31421 |
| 7.00000 | .42957 |
| 8.00000 | .56396 |
| 9.00000 | .71802 |
| 10.00000 | .89246 |
| 11.00000 | 1.08816 |
| 12.00000 | 1.30617 |
| 13.00000 | 1.54772 |
| 14.00000 | 1.81430 |
| 15.00000 | 2.10771 |
| 16.00000 | 2.43011 |
| 17.00000 | 2.78417 |
| 18.00000 | 3.17321 |

$k_2 = 3.3606385$

Fifth Embodiment

Aspherical Surface of Concave Reflection Mirror

| Value of Y axis | Sag Value |
|---|---|
| .00000 | .00000 |
| 1.00000 | .00848 |
| 2.00000 | .03393 |
| 3.00000 | .07641 |
| 4.00000 | .13602 |
| 5.00000 | .21288 |
| 6.00000 | .30713 |
| 7.00000 | .41892 |
| 8.00000 | .54842 |
| 9.00000 | .69578 |
| 10.00000 | .88118 |
| 11.00000 | 1.04481 |
| 12.00000 | 1.24689 |
| 13.00000 | 1.46788 |
| 14.00000 | 1.70746 |
| 15.00000 | 1.96659 |
| 16.00000 | 2.24536 |
| 17.00006 | 2.54401 |
| 18.00000 | 2.86247 |

$S_1$ Surface

| Value of Y axis | Sag Value |
|---|---|
| .00000 | .00000 |
| 1.00000 | .00848 |
| 2.00000 | .03391 |
| 3.00000 | .07633 |
| 4.00000 | .13579 |
| 5.00000 | .21234 |
| 6.00000 | .30608 |
| 7.00000 | .41711 |
| 8.00000 | .54555 |
| 9.00000 | .69155 |
| 10.00000 | .85527 |
| 11.00000 | 1.03690 |
| 12.00000 | 1.23667 |
| 13.00000 | 1.45481 |
| 14.00000 | 1.69158 |
| 15.00000 | 1.94729 |
| 16.00000 | 2.22226 |
| 17.00000 | 2.51683 |
| 18.00000 | 2.83142 |

$k_1 = 0.2610797$

$S_2$ Surface

| Value of Y axis | Sag Value |
|---|---|
| .00000 | .00000 |
| 1.00000 | .00848 |
| 2.00000 | .03394 |
| 3.00000 | .07649 |
| 4.00000 | .13630 |
| 5.00000 | .21360 |
| 6.00000 | .30870 |
| 7.00000 | .42201 |
| 8.00000 | .65402 |
| 9.00000 | .70533 |
| 10.00000 | .87663 |
| 11.00000 | 1.08879 |
| 12.00000 | 1.28282 |
| 13.00000 | 1.51992 |
| 14.00000 | 1.78153 |
| 15.00000 | 2.06939 |
| 16.00000 | 2.38559 |
| 17.00000 | 2.73272 |
| 18.00000 | 3.11398 |

$k_2 = 3.4810627$

It is apparent from data that the above mentioned embodiments satisfy the above-said conditions. It is also clear from the sag values of the aspherical surface and the sag values of the ellipse rotation surfaces $S_1$ and $S_2$ that the aspherical surface used in each embodiment exists between the ellipse rotation surfaces $S_1$ and $S_2$. Further, it can be seen from the aberration curves shown in FIGS. 6 to 10 that each aberration is corrected in a well-balanced manner. It should be noted that the aberration curves are drawn when the light is made incident upon the optical system from the eye side and then imaged on the display and in the drawings of the aberration curves the height, until the peripheral portion of the pupil of the observer is taken as a maximum value on the longitudinal axis.

The shape of the aspherical surfaces used in the embodiments is represented by the following formula.

$$z = \frac{Cy^2}{1 + \sqrt{1 - (k+1)C^2y^2}} + \sum_{i=2}^{n} A_i y^{2i}$$

In order to obtain a high magnification in the optical system for use in a display according to the present invention, it is desirable to use a Fresnel reflecting mirror as a magnifying reflecting mirror. That is to say, when the concave reflecting mirror is used as the magnifying reflecting mirror, since the light reflecting surface thereof is a concave surface, the peripheral portion of the concave reflecting mirror appears close to the combiner with respect to the reflecting point on the optical axis. The depth of the concave surface (sag) prevents the magnification of the optical system becomes high, however, in order to make the magnification of the optical system high, it is necessary to make the focal length of the concave reflecting mirror $f_R$ short, so that the sag becomes greater. On the other hand, it is necessary to make the combiner big in order to obtain enough field of view. For these reasons, it is necessary to make the space for the optical system large.

If the Fresnel reflection mirror is used as the magnifying reflection mirror to solve the above problem, the sag amount substantially becomes zero, which is very effective. The optical system using a Fresnel reflection mirror according to the present invention has for its construction that an image display means and a Fresnel reflecting mirror are arranged on the opposite side of the image display means to the combiner instead of a concave reflecting mirror, and the system satisfies the following conditions (5) and (6):

$$0.8 < f/f_R \leq 1.0 \tag{5}$$

$$0.65 < d/f_R < 0.95 \tag{6}$$

The reason why the conditions (5) and (6) are defined is almost the same as the reason why the conditions (1) and (2) are provided which are for the general concave refracting mirror.

That is to say, when the value of the condition (5) becomes 1.0, that is to say, the power of the concave reflection mirror occupies the power of the lens system as a whole, the power of the auxiliary lens becomes 0, that shows the auxiliary lens is a plane-parallel plate. When the value of the condition (5) is less than 1.0, the auxiliary lens becomes a convex lens having a weak refractive power. As the value of the condition (5) comes closer to the upper limit thereof, the Fresnel reflecting mirror and the image display means come closer to each other, so that it becomes more difficult to obtain enough space between the Fresnel reflection mirror and the auxiliary lens and between the auxiliary lens and the image display means. However, such an arrangement has an advantage in making the magnification large as much as possible in the optical system where the diopter is not controlled.

On the other hand, when the value of the condition (5) becomes less than the lower limit, enough distance between the optical elements can be obtained, but the observer receives the light generated to his eyes in an extremely inclined direction from the image display. Therefore, if an LCD having a strong directional characteristic is used as the image display, the performance of the optical system deteriorates. Further, the power of the auxiliary lens becomes strong so that chromatic aberration will be generated.

For these reasons, the desired range of the condition (5) is 0.85 to 1.0.

The condition (6) is provided to give the necessary amount of the aperture to the combiner. When it is arranged that the Fresnel reflecting mirror is moved up and down to control the diopter, it is required to select the value around the upper limit of the condition (6); while when the image display is moved up and down to control the diopter, the value around the lower limit must be selected.

The auxiliary lens serves not only to compensate for the power distribution of the system which depends on the selection of the value concerning the condition (5) but also to interrupt any stray light, directly arriving to the eyes of the observer from the LCD and to protect the system from dust.

When an aspherical surface is introduced in the optical system for use in a display using the Fresnel reflecting mirror in order better to correct the aberrations, it is preferred that when the Fresnel surface is restored to a continued single surface the shape of the restored aspherical surface exists between the ellipse rotation surface $S_3$, which is represented by the formula (7) and the ellipse rotation surface $S_4$, which is shown by the formula (8).

$$z = \frac{Cy^2}{1 + \sqrt{1 - (k_3 + 1)C^2y^2}} \tag{7}$$

where $k_3 C^2 = -7.5 \times 10^{-5}$ $$z = \frac{Cy^2}{1 + \sqrt{1 - (k_4 + 1)C^2y^2}} \tag{8}$$

where $k_4 C^2 = -1.0 \times 10^{-3}$

In the formulae (7) and (8), the reference symbols $k_3$ and $k_4$ represent coefficients of the aspherical surfaces, respectively and the C represents the curvature of the standard surface.

In the optical system using the Fresnel reflecting mirror, there is no factor to make the Petzval's sum negative, which is different from the system using the concave reflecting mirror. Therefore, the image surface is curved to the under-corrected side as well as the general refractive optical system. Thus, the aspherical surface to be introduced in the Fresnel surface (Fresnel concave surface) serves to correct the image surface to the positive side.

Therefore, it is desired that the aspherical surface used in the optical system according to the present invention exists between the ellipse rotation surface $S_3$ represented by the formula (7) and the ellipse rotation surface $S_4$ represented by the formula (8) when the Fresnel surface is restored into a continued single surface.

Embodiments of the optical system for use in the display according to the present invention will be explained below where a Fresnel reflection mirror is used in order to make the magnification greater will be explained below.

Figure 11:
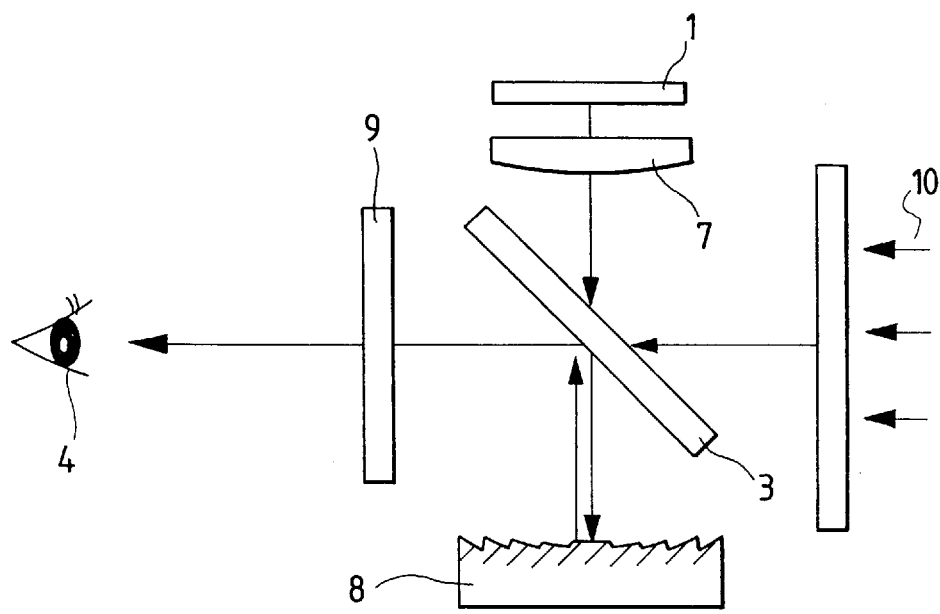
FIG. 11 is a schematic view illustrating another construction of the image displaying/observing portion of the head mount display according to the present invention.

FIG. 11 is a schematic view showing a construction of the optical system according to the invention where a Fresnel reflection mirror is used. In FIG. 11, the numerical reference 1 represents an image information means, 3 represents a combiner, 4 represents the eyes of an observer, 7 represents an auxiliary lens, 8 represents a Fresnel reflection mirror, and the numerical reference 9 denotes a transparent plane-parallel plate, which is arranged for dust-proof purposes.

In the optical system shown in FIG. 11, light coming from an image information means 1 is transmitted through the auxiliary lens 7 and to the combiner 3 and the light is reflected by the Fresnel reflecting mirror 8 and is then reflected by the combiner 3 to be introduced to the eyes of the observer. Thereby, the image of the image information means is observed in a magnified manner. On the other hand, light coming from the outside is transmitted through the combiner 3 to be directed to the eyes 4 of the observer, so that the magnified image from the image information means 1 and the image coming from outside are observed in a superimposed manner.

It is apparent that the optical system using a Fresnel reflecting mirror, which is shown in FIG. 11, can be made extremely compact in size in comparison to the optical system shown in FIG. 5 where a general concave reflecting mirror is used. Further, even if the system is so designed that the radius of curvature of the Fresnel reflection mirror is made small to make the magnification ratio great, the optical system per se does not become large.

By the arrangement that where the Fresnel surface of the Fresnel reflecting mirror is restored into a continued single surface the surface is arranged as an aspherical surface, each aberration of the optical system can be well corrected and a preferred magnified image can be observed. In this case, the shape of the aspherical surface must exist between the ellipse rotation surface represented by the condition (7) and the ellipse rotation surface shown by the condition (8) as mentioned above.

In case an aspherical surface is introduced on the Fresnel reflecting mirror, it is desirable that the shape of the aspherical surface when it is restored into a continued single surface exists between the ellipse rotation surface $S_3$ represented by the above-said condition (7) and the ellipse rotation surface $S_4$ represented by the above-said condition (8).

As stated above, the Fresnel reflecting mirror is used in order to solve the problem that the space between the optical elements becomes small to make the magnification of the optical system large. Therefore, the image information means comes near to the combiner and the distance between the means and the auxiliary lens becomes short. In this case, the power of the auxiliary lens is weak, the value of the $f/f_R$ in the condition (5) close to 1 unlimited. Because, if giving a power to the auxiliary lens, it is in contradiction to the directional characteristic of the image information means. When the value of $f/f_R$ becomes 1 ($f/f_R=1$), the auxiliary lens becomes a plane-parallel plate. It should also be noted that it is possible to introduce an aspherical surface even to the parallel plate.

In the optical system using a Fresnel reflection mirror according to the present invention, in order to correct aberrations more desirably, it is considered that at least one of the surfaces of the plane-parallel plate 9 is arranged as an aspherical surface. In this case the aspherical surface influences the light 10 coming from the outside because the light 10 coming from outside arrives to the eyes 4 of the observer after being transmitted through the plane-parallel plate 9. That is to say, as a result that the outside image is observed via the aspherical surface, and the image is observed in a deformed manner. Therefore, it is desirable that the aspherical surface formed on the plane-parallel plate 9 is weak so that the outside image is not greatly deformed.

It is also desirable that the absolute value of sag amount of the aspherical surface used in the parallel plate is within 0.05 mm with respect to a flat plane in a range of the diameter of 22 mm about the optical axis.

If an aspherical surface has an absolute value of sag amount exceeding over 0.05 mm, the aberrations are corrected in addition to the correction by the aspherical surface found on the Fresnel reflection mirror, so that the aberrations generated in the optical system can be corrected satisfactorily, and the quality of the magnified image of the image information can be improved much more. However, there is a disadvantage in that the above-said deformation becomes large. It may be possible to provide one more plane-parallel plate outside of the optical system and form an aspherical surface thereon, so that the influence of the aspherical surface formed on the plane-parallel plate 9 is canceled.

The embodiments of the optical system using a Fresnel reflection mirror according to the present invention will be explained below.

Sixth Embodiment

| Surface No. | Radius of Curvature (mm) | Distance between surfaces (mm) | Refractive Index | Abbe's Number |
|---|---|---|---|---|
| 1 | 0.000 | 11.7000 | 1.00000 | |
| 2 | 0.000 | 1.5000 | 1.49149 | 56.09 |
| 3 | 0.000 | 11.7500 | 1.00000 | |
| 4 | 0.000 | −11.0000 | −1.00000 | |
| 5 | 43.333 | 19.5600 | 1.00000 | |
| 6 | 0.000 | 1.5000 | 1.49149 | 56.09 |
| 7 | 0.000 | 0.8647 | 1.00000 | |

Coefficient of Aspherical Surface

2nd surface K=0
$A_2=-1.556534\times10^{-5}$
$A_3=2.850750\times10^{-7}$
$A_4=-1.380076\times10^{-9}$ 5th surface $K=-9.494072\times10^{-1}$
$A_2=-4.039607\times10^{-7}$
$A_3=1.789172\times10^{-9}$
$A_4=31\ 1.80002\times10^{-12}$ $f/f_R=1$
$d/f_R=0.903$ Seventh Embodiment

| Surface No. | Radius of Curvature (mm) | Distance between surfaces (mm) | Refractive Index | Abbe's Number |
|---|---|---|---|---|
| 1 | 0.000 | 11.7000 | 1.00000 | |
| 2 | 0.000 | 1.5000 | 1.49149 | 56.09 |
| 3 | 0.000 | 11.7500 | 1.00000 | |
| 4 | 0.900 | −11.0000 | −1.00000 | |
| 5 | 43.333 | 19.5600 | 1.00000 | |
| 6 | 0.000 | 1.5000 | 1.49149 | 56.09 |
| 7 | 0.000 | 0.8646 | 1.00000 | |

Coefficient of Aspherical Surface

1st surface K=0
$A_2=0.9103500\times10^{-6}$
$A_3=0.1572960\times10^{-6}$
$A_4=0.6706500\times10^{-9}$ 3rd surface $K=-0.9437329$
$A_2=0.2296511\times10^{-6}$
$A_3=0.8375823\times10^{-9}$
$A_4=-0.5532406\times10^{-12}$ $f/f_R=1$
$d/f_R=0.903$ In these data, the surface number 1 represents the eyes of the observer, 2 and 3 represents the eye side surface of the plane-parallel plate and a combiner side surface of the plane-parallel plate, respectively, 4 represents a combiner, 5 represents the Fresnel reflection mirror, 6 represents the surface of the auxiliary lens on the combiner side, and the surface number 7 represents the surface of the auxiliary lens on the image display means side. The minus sign shown on the distance and refractive index indicates that the light goes into the opposite direction.

In either of the sixth and seventh embodiments, a Fresnel reflecting reflecting mirror is used where the Fresnel surface is an aspherical surface when the Fresnel surface is restored to a continued single surface, and aberrations are corrected by the aspherical surface. At the same time, the eye side surface of the plane-parallel plate provided on the eye side is also arranged as an aspherical surface, and the aberrations are corrected by the aspherical surface formed on the Fresnel reflecting mirror to compensate for the correction of aberrations so that a preferred image can be observed. It should be noted that in the sixth embodiment, an absolute value of the sag amount of the aspherical surface on tie plane-parallel plate provided on an eye side is 0.05 mm or less, so that the deformation is extremely small when the observer observes the outside through the plane-parallel plate and there is no problem in the observation.

In the seventh embodiment, the construction is such that the sag amount of the aspherical surface provided on the eye side of the plane-parallel plate on the eye side becomes large and thus the aberrations on the optical system as a whole become few. When observation of the outside is conducted through the plane-parallel plate, the image is deformed slightly. In order to solve this problem, another aspherical surface is formed on the plane-parallel plate which is provided on the outside of the combiner in order to cancel the aberrations caused by the aspherical surface provided on the plane-parallel plate on the eye side. Thereby, the image obtained from the image display portion can be observed in a good manner without causing many aberrations; in addition to this, the outside image, which is not influenced by the aspherical surface, can be superimposed on the image from the image display portion to be observed.

The sag value of the aspherical surface provided on the Fresnel reflecting mirror in the sixth and seventh embodiments and the sag values of the ellipse rotation surfaces $S_3$ and $S_4$ are as follows.

Sixth Embodiment

Fresnel Concave Reflection Mirror

| Value of Y axis | Sag Value |
|---|---|
| .00000 | .00000 |
| 1.00000 | .01154 |
| 2.00000 | .04616 |
| 3.00000 | .10382 |
| 4.00000 | .18454 |
| 5.00000 | .28829 |
| 6.00000 | .41505 |
| 7.00000 | .56481 |
| 8.00000 | .73757 |
| 9.00000 | .93336 |
| 10.00000 | 1.15220 |
| 11.00000 | 1.39417 |
| 12.00000 | 1.66936 |
| 13.00000 | 1.94787 |
| 14.00000 | 2.25985 |
| 15.00000 | 2.59544 |
| 16.00000 | 2.95479 |
| 17.00000 | 3.33805 |
| 18.00000 | 3.74530 |
| $S_3$ surface | |
| .00000 | .00000 |
| 1.00000 | .01154 |
| 2.00000 | .04618 |
| 3.00000 | .10395 |
| 4.00000 | 18496 |
| 5.00000 | .28929 |
| 6.00000 | .41711 |
| 7.00000 | .56859 |
| 8.00000 | .74395 |
| 9.00000 | .94344 |
| 10.00000 | 1.16736 |
| 11.00000 | 1.41604 |
| 12.00000 | 1.68985 |
| 13.00000 | 1.98923 |
| 14.00000 | 2.31466 |
| 15.00000 | 2.66666 |
| 16.00000 | 3.04582 |
| 17.00000 | 3.45281 |
| 18.00000 | 3.88836 |
| $S_4$ Surface | |
| .00000 | .00000 |
| 1.00000 | .01154 |
| 2.00000 | .04613 |
| 3.00000 | .10374 |
| 4.00000 | .18427 |
| 5.00000 | .28762 |
| 6.00000 | .41365 |
| 7.00000 | .56219 |
| 8.00000 | .73302 |
| 9.00000 | .92594 |
| 10.00000 | 1.14067 |
| 11.00000 | 1.37696 |
| 12.00000 | 1.63449 |
| 13.00000 | 1.91294 |
| 14.00000 | 2.21199 |
| 15.00000 | 2.53127 |
| 16.00000 | 2.87041 |
| 17.00000 | 3.22903 |
| 18.00000 | 3.60673 |
| Eye side Plane-Parallel Plate | |
| 0.00000 | 0.00000 |
| 1.00000 | −0.00002 |
| 2.00000 | −0.00023 |
| 3.00000 | −0.00106 |
| 4.00000 | −0.00291 |
| 5.00000 | −0.00581 |
| 6.00000 | −0.00919 |
| 7.00000 | −0.01179 |
| 8.00000 | −0.01218 |
| 9.00000 | −0.01003 |
| 10.00000 | −0.00859 |
| 11.00000 | −0.01870 |

Seventh Embodiment

Fresnel Concave Reflection Mirror

| Value of Y axis | Sag Value |
|---|---|
| 0.00000 | 0.00000 |
| 1.00000 | 0.01154 |
| 2.00000 | 0.04616 |
| 3.00000 | 0.10387 |
| 4.00000 | 0.18470 |
| 5.00000 | 0.28867 |
| 6.00000 | 0.41583 |
| 7.00000 | 0.56624 |
| 8.00000 | 0.73997 |
| 9.00000 | 0.93711 |
| 10.00000 | 1.15779 |
| 11.00000 | 1.40215 |
| 12.00000 | 1.67037 |
| 13.00000 | 1.96263 |
| 14.00000 | 2.27919 |
| 15.00000 | 2.62030 |
| 16.00000 | 2.98627 |
| 17.00000 | 3.37742 |
| 18.00000 | 3.79409 |
| Eye side Plane-Parallel Plate | |
| 0.00000 | 0.00000 |

-continued

Fresnel Concave Reflection Mirror

| Value of Y axis | Sag Value |
| --- | --- |
| 1.00000 | 0.00000 |
| 2.00000 | 0.00002 |
| 3.00000 | 0.00018 |
| 4.00000 | 0.00083 |
| 5.00000 | 0.00276 |
| 6.00000 | 0.00739 |
| 7.00000 | 0.01683 |
| 8.00000 | 0.03371 |
| 9.00000 | 0.06070 |
| 10.00000 | 0.09933 |
| 11.00000 | 0.14823 |

Figure 12A:
FIGS. 12 and 13 represent aberration curves of the optical systems in the sixth and seventh embodiments of the present invention, respectively.
Figure 12B:
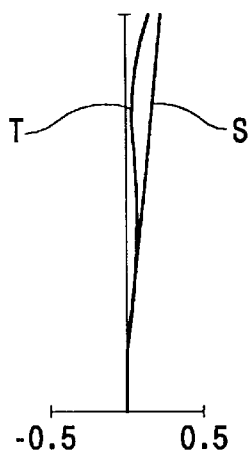
Figure 12C:
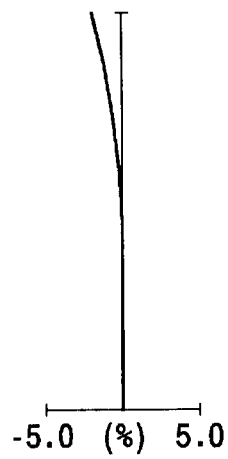
Figure 13A:
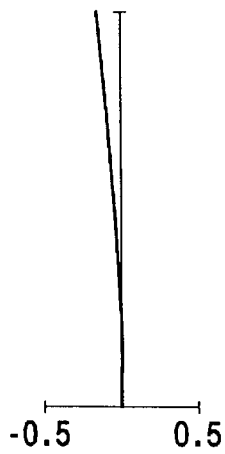
Figure 13B:
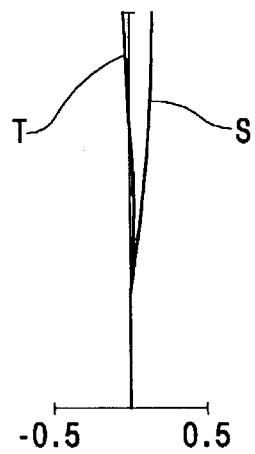
Figure 13C:
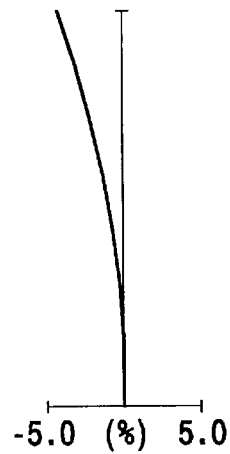

The aberration conditions in the sixth and seventh embodiments are as shown in FIGS. 12 and 13.

It will be explained below how the outside image is observed by the aspherical surface provided on the eye side plane-parallel plate in the sixth and seventh embodiments.

Figure 14:
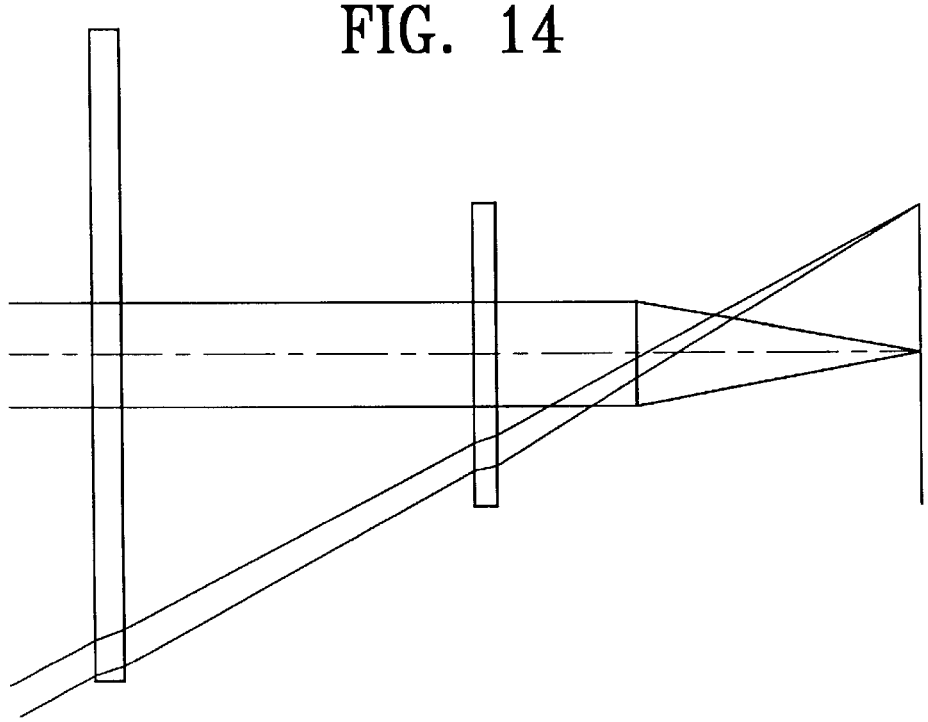
FIG. 14 is a schematic view showing a construction of a system extending from the outside to the eyes of the observer in the sixth and seventh embodiments.

The following data show an optical system extending from the outside to the eyes as shown in FIG. 14. At the level of the eyes, represented by the sixth surface, of the optical system is disposed an ideal lens.

| Surface No. | Radius of Curvature | Distance surfaces | Refractive Index | Abbe's Number |
| --- | --- | --- | --- | --- |
| 1 | 0.000 | 1960.1500 | | |
| 2 | 0.000 | 2.0000 | 1.49194 | 56.09 |
| 3 | 0.000 | 25.7500 | | |
| 4 | 0.000 | 1.5000 | 1.49194 | 56.09 |
| 5 | 0.000 | 11.7500 | | |
| 6 | 20.000 | 20.2020 | | |
| 7 | 0.000 | 0.0000 | | |

According to the above data, no aspherical surface is on the outer side plane-parallel plate in the sixth embodiment. Contrary to this, in the seventh embodiment, the aspherical surface amount of the aspherical surface provided on the eye side plane-parallel plate is large and thus the other outside image is deformed; the aspherical surface is provided on the outer side plane-parallel plate in order to correct the deformation of the outside image. The aspherical coefficients of the aspherical surface provided on he outer side plane-parallel plate in the seventh embodiment are as follows. It should be noted that the fourth surface is arranged as an aspherical surface which already shown above in the sixth and seventh embodiments.

3rd Surface K=0

Figure 15A:
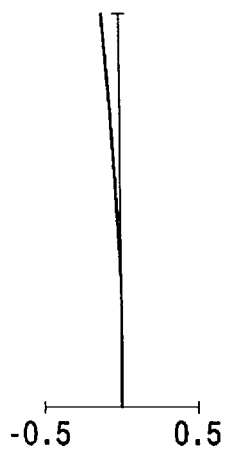
FIG. 15 is a schematic view depicting aberration curves of the system extended from the outside to the eyes of the observer in the sixth embodiment.
Figure 15B:
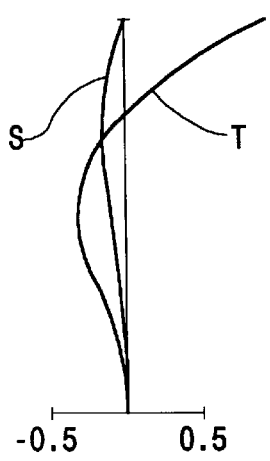
Figure 15C:
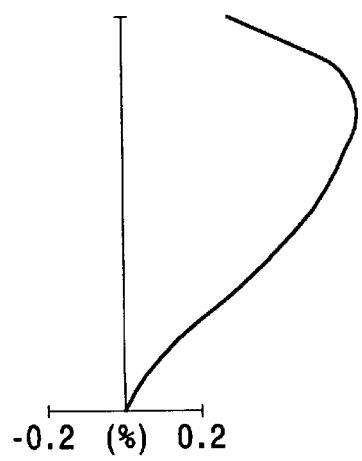
Figure 16A:
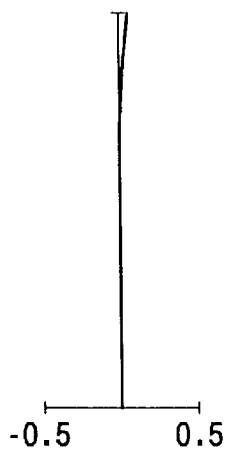
FIG. 16 is a schematic view illustrating aberration curves of the system extended from the outside to the eyes of the observer in the seventh embodiment where no aspherical surface is provided on a plane-parallel plate arranged on the outer side.
Figure 16B:
Figure 16C:
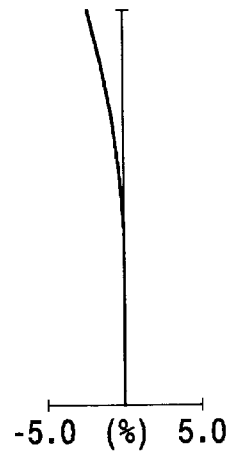
Figure 17A:
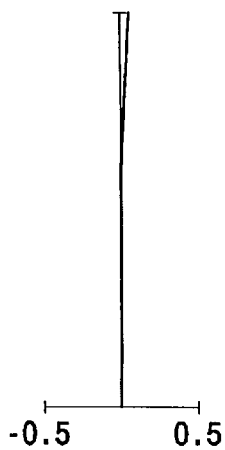
FIG. 17 is a schematic view representing aberration curves of the system extended from the outside to the eyes of the observer in the seventh embodiment, where an aspherical surface is generated on the plane-parallel plate on the outer side.
Figure 17B:
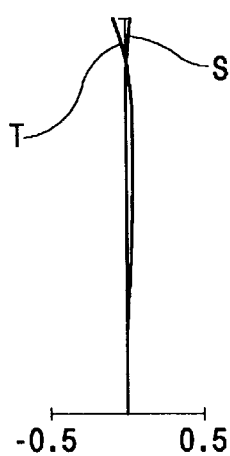
Figure 17C:
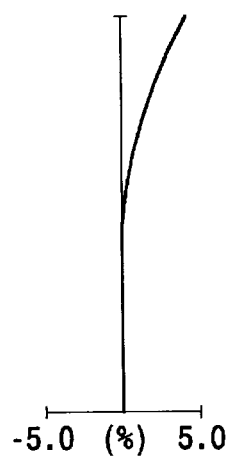

$A_2 = 7.548915 \times 10^{-9}$ $A_3 = -7.011273 \times 10^{-9}$ $A_4 = 1.160533 \times 10^{-12}$ In FIGS. 15 to 17, are shown aberration curves for the above data, i.e. aberration curves when light is made incident upon the position of −0.5 diopter from the outside and is then transmitted through the outer side plane-parallel plate and the eye side plane-parallel plate and then imaged by the ideal lens, which causes no aberration. In FIG. 15, are shown aberration curves of the light from the outside in the sixth embodiment; in FIG. 16, are illustrated aberration curves in the seventh embodiment where no aspherical surface is provided on the outer side plane-parallel plate; and in FIG. 17 are depicted aberration curves in the seventh embodiment where an aspherical surface having an aspherical coefficient mentioned above is provided on the outer side plane-parallel plate.

As shown in these Figures, in the sixth embodiment, when observing the outside image, the image can be obtained with only slight aberrations. Further, in the seventh embodiment, large aberrations are caused by the aspherical surface provided on the eye side plane-parallel plate. However, these aberrations can be reduced by providing an aspherical surface on the outer side plane-parallel plate. Industrial Applicable Possibility As explained above, according to the head mount display of the present invention, the size is compact and well balanced. Further, the optical system causes almost no chromatic aberration and other aberrations are corrected in a well-balanced condition, so that a preferred image may be obtained. Furthermore, when a Fresnel reflecting mirror is used as the magnifying mirror, the magnification ratio becomes great and the size of the optical system can be made more compact while keeping qualification of the image high.

We claim:

1. A head mount display, where an image displayed on an image display means and an outside image are observed in a superimposed manner, comprising a combiner for transmitting and reflecting light coming from said image displayed on said image display means and a Fresnel magnifying reflecting mirror being arranged on the opposite side of said image display means to said combiner;

wherein said light coming from said image displayed on said image display means is transmitted through said combiner and reflected by said magnifying reflecting mirror and the light is reflected by the magnifying reflecting mirror and is then reflected by said combiner to be directed to the eyes of an observer; while, light coming from the outside is transmitted through said combiner to be directed to the eyes of the observer; whereby said image displayed on said image display means and said outside image are observed in a superimposed manner.

2. A head mount display, where an image displayed on an image display means and an outside image are observed in a superimposed manner, comprising a combiner for transmitting and reflecting light coming from said image displayed on said image display means, a Fresnel magnifying reflecting mirror being arranged on an opposite side of said image display means to said combiner, and a lens having a weak refractive power for correcting aberrations and being arranged between said image display means and said combiner;

wherein said light coming from said image displayed on said image display means is transmitted through said combiner after transmitting through said lens and the light is reflected by said magnifying reflecting mirror and is then reflected by said combiner to be directed to eyes of an observer, while, light coming from the outside is transmitted through said combiner to be directed to the eyes of the observer; and whereby image displayed on said image displayed means and an outside image are observed in a superimposed manner thereby.

3. An optical system for use in a display, comprising an image display means, a combiner for transmitting and reflecting light coming from said image displayed on said image display means, a concave reflecting mirror being arranged on an opposite side of said image display means to said combiner, and an auxiliary lens being arranged between said image display means and said combiner;

wherein said light coming from said image display means is transmitted through said combiner and said auxiliary lens and the light is reflected by said magnifying reflecting mirror and then reflected by said combiner to be directed to the eyes of an observer, while, light coming from the outside is transmitted through said combiner to be directed to said eyes of the observer; whereby said image displayed on said image display means and an outside image are observed in a superimposed manner;

wherein said optical system satisfies the following conditions (1) and (2);

$$0.85 < f/f_R \leq 0.95 \quad (1)$$

$$0.65 < d/f_R < 0.9 \quad (2)$$

where the reference symbol f represents the focal length of the optical system as a whole, the reference symbol $f_R$ represents the focal length of said concave reflection mirror itself, the reference symbol d represents the distance between said concave reflecting mirror and a surface of said auxiliary lens on its combiner side when a diopter is zero.

4. An optical system according to claim 3, wherein:

said concave reflecting mirror is arranged as an aspherical surface existing between an ellipse rotation surface $S_1$ represented by the following formula (3) and an ellipse rotation surface $S_2$ represented by the following formula (4):

$$z = \frac{Cy^2}{1 + \sqrt{1 - (k_1 + 1) \; C^2 y^2}} \quad (3)$$

where $k_1 C^2 = 7.5 \times 10^{-5}$ $$z = \frac{Cy^2}{1 + \sqrt{1 - (k_2 + 1) C^2 y^2}} \quad (4)$$

where $k_2 C^2 = 1.0 \times 10^{-3}$ where the reference symbols $k_1$ and $k_2$ represent coefficients of said aspherical surface, respectively, and the reference symbol C represents the curvature (an inverse number of a radius of curvature) of a standard surface.

5. An optical system for use in a display, comprising an image display means, a combiner for transmitting and reflecting light coming from said image displayed on said image display means, a Fresnel reflecting mirror being arranged on an opposite side of said image display means about said combiner, and an auxiliary lens being arranged between said image display means and said combiner;

wherein said light coming from said image displayed on said image display means is transmitted through said combiner and the light is reflected by said Fresnel reflecting mirror and then reflected by said combiner to be directed to eyes of an observer, while, light coming from the outside is transmitted through said combiner to be directed to said eyes of the observer; whereby said image displayed on said image displayed means and an outside image are observed in a superimposed manner; and wherein said optical system satisfies the following conditions (5) and (6);

$$0.8 < f/f_R \leq 1.0 \quad (5)$$

$$0.65 < d/f_R < 0.95 \quad (6)$$

where the reference symbol f represents the focal length of the optical system as a whole, the reference symbol $f_R$ represents the focal length of said Fresnel reflecting mirror itself, the reference symbol d represents the distance between said concave reflecting mirror and the surface of said auxiliary lens on its combiner side when a diopter is zero.

6. An optical system according to claim 5, wherein:

said Fresnel reflection mirror is arranged such that when the Fresnel surface is restored into a continued single surface the single surface is an aspherical surface existing between an ellipse rotation surface $S_3$ represented by the following formula (7) and an ellipse rotation surface $S_4$ represented by the following formula (8):

$$z = \frac{Cy^2}{1 + \sqrt{1 - (k_3 + 1)C^2 y^2}} \quad (7)$$

where $k_3 C^2 = -7.5 \times 10^{-5}$ $$z = \frac{Cy^2}{1 + \sqrt{1 - (k_4 + 1)C^2 y^2}} \quad (8)$$

where $k_4 C^2 = -1.0 \times 10^{-3}$ where the reference symbols $k_3$ and $k_4$ represent coefficients of said aspherical surfaces, respectively, and the reference symbol C represents the curvature (an inverse number of a radius of curvature) of a standard surface.

* * * * *